US012698742B2

(12) United States Patent
Thiriet et al.

(10) Patent No.: US 12,698,742 B2
(45) Date of Patent: Aug. 4, 2026

(54) HYBRID PROPULSION SYSTEM FOR AN AIRCRAFT

(71) Applicant: SAFRAN HELICOPTER ENGINES, Bordes (FR)

(72) Inventors: Romain Jean Gilbert Thiriet, Moissy-Cramayel (FR); Camel Serghine, Moissy-Cramayel (FR); Thomas Drouin, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/993,434

(22) PCT Filed: Jul. 10, 2023

(86) PCT No.: PCT/FR2023/051064
§ 371 (c)(1),
(2) Date: Jan. 10, 2025

(87) PCT Pub. No.: WO2024/018137
PCT Pub. Date: Jan. 25, 2024

(65) Prior Publication Data
US 2025/0250943 A1    Aug. 7, 2025

(30) Foreign Application Priority Data

Jul. 20, 2022    (FR) ...................................... 2207431

(51) Int. Cl.
*F02C 7/36*        (2006.01)
*B64D 27/33*      (2024.01)
*B64D 35/022*    (2025.01)

(52) U.S. Cl.
CPC ................ *F02C 7/36* (2013.01); *B64D 27/33* (2024.01); *B64D 35/022* (2024.01); *F05D 2220/76* (2013.01)

(58) Field of Classification Search
CPC ......... F02C 7/36; B64D 27/33; B64D 35/022; F05D 2220/76
See application file for complete search history.

(56) References Cited

U.S. PATENT DOCUMENTS

| | | | | |
|---|---|---|---|---|
| 2004/0003595 A1* | 1/2004 | Ichinose | ................... | F02C 7/36 60/698 |
| 2006/0225431 A1* | 10/2006 | Kupratis | ................... | F02C 3/10 60/39.24 |

(Continued)

FOREIGN PATENT DOCUMENTS

| | | |
|---|---|---|
| EP | 3690214 A1 | 8/2020 |
| FR | 3062882 B1 | 10/2019 |
| GB | 2589193 A | 5/2021 |

OTHER PUBLICATIONS

International Search Report received for PCT Patent Application No. PCT/FR2023/051064, mailed on Oct. 5, 2023, 6 pages (2 pages of English Translation and 4 pages of Original Document).

*Primary Examiner* — Andrew H Nguyen
(74) *Attorney, Agent, or Firm* — WOMBLE BOND DICKINSON (US) LLP

(57) ABSTRACT

A hybrid propulsion system including a turbine engine including a high-pressure spool and a low-pressure spool, the low-pressure spool including reduction gear, the reduction gear forming part of a transmission gearbox which is positioned axially at a front end of the propulsion system; —first and second electric machines mechanically and respectively connected to the high-pressure and low-pressure spools, the electric machines being configured to operate in modes referred to as motor and generator, the first and (Continued)

second electric machines being fixed to the transmission gearbox; —a control system which is configured to allow the transfer of power between the high-pressure and low-pressure spools via the first and second electric machines.

19 Claims, 2 Drawing Sheets

(56) References Cited

U.S. PATENT DOCUMENTS

| | | | | |
|---|---|---|---|---|
| 2009/0232640 | A1* | 9/2009 | Deperrois | F02C 7/32 |
| | | | | 74/606 R |
| 2012/0025032 | A1* | 2/2012 | Hopdjanian | B64C 27/14 |
| | | | | 903/905 |
| 2016/0245163 | A1* | 8/2016 | Lamarre | F01C 1/22 |
| 2017/0051667 | A1* | 2/2017 | Godman | F02C 3/04 |
| 2018/0009542 | A1* | 1/2018 | Kuster | B64D 27/33 |
| 2019/0218977 | A1* | 7/2019 | Muldoon | F02C 7/32 |
| 2019/0352001 | A1* | 11/2019 | Thiriet | B64C 27/12 |
| 2020/0182158 | A1 | 6/2020 | Kupratis | |
| 2020/0240331 | A1 | 7/2020 | Kupratis et al. | |
| 2020/0307818 | A1* | 10/2020 | Dubreuil | H02K 7/102 |
| 2020/0386188 | A1 | 12/2020 | Kupratis et al. | |
| 2021/0062719 | A1* | 3/2021 | Erickson | F01D 25/20 |
| 2024/0018901 | A1 | 1/2024 | Kupratis et al. | |

* cited by examiner

HYBRID PROPULSION SYSTEM FOR AN AIRCRAFT

TECHNICAL FIELD OF THE INVENTION

This invention relates to a hybrid propulsion system for an aircraft.

TECHNICAL BACKGROUND

The hybrid electric propulsion of an aircraft is one way of significantly reducing the carbon footprint of the air transport.

Such a propulsion system combines, for example, a thermal turbomachine and one or more electric machines capable of supplementing or complementing the turbomachine. The combination of thermal and electrical energy significantly reduces the fuel consumption of the turbomachine, and consequently its carbon dioxide emissions.

The application FR-B1-3062882 in the name of the applicant describes a hybrid propulsion system for a helicopter comprising a main turboshaft engine and an electric machine which is used in an emergency situation (e.g. when the main turboshaft engine fault), in order to momentarily provide power to the helicopter for certain maneuvers.

Such a propulsion system may be improved, and engine manufacturers are studying the various possibilities for integrating one or more electric machines in the best possible way, in particular to optimize the overall size of the propulsion system, minimize modifications and facilitate maintenance of the electric machine or electric machines.

The aim of the present invention is therefore to provide a simple, effective and economical solution to the above problems.

The prior art also comprises the documents US2020/386188A1, US2020/182158A1 and GB2589193A.

SUMMARY OF THE INVENTION

The invention thus proposes a hybrid propulsion system for an aircraft comprising:
- a turboshaft engine comprising a high-pressure spool and a low-pressure spool movable in rotation, the high-pressure spool comprising a compressor and an expansion turbine mechanically connected to each other by a high-pressure shaft, the low-pressure spool comprising a power turbine which drives a power take-off in rotation via a reduction gear, the reduction gear forming part of a transmission gearbox which is arranged axially at a front end of the propulsion system;
- first and second electric machines mechanically connected to the high-pressure and low-pressure spools respectively, the electric machines being configured to operate in so-called motor and generator modes, the first and second electric machines being attached to the transmission gearbox;
- a control system which is configured to allow power to be transferred between the high-pressure and low-pressure spools via the first and second electric machines.

Positioning the electric machines in this way not only optimizes the overall size of the propulsion system, but also minimizes the modifications required to integrate the electric machines and facilitates maintenance operations, as the electric machines are accessible and positioned in an unobstructed environment.

For each electric machine, the transmission gearbox ensures the transmission of the rotational movement between the spool and the electric machine, while offering the possibility of modifying the parameters associated with the movement (speed, torque, etc.), so as to operate the spool and the electric machine within the desired operating ranges.

The transfer of power between the high-pressure and low-pressure spools via the electric machines allows to optimize the performance of the propulsion system across the assembly of its operating speeds.

The propulsion system according to the invention may comprise one or more of the following characteristics and/or steps, taken in isolation from each other or in combination with each other:
- the first and second electric machines are attached to a front face of the transmission gearbox;
- the first electric machine is connected to the high-pressure spool via a first transmission mechanism arranged in the transmission gearbox, the first transmission mechanism preferably being a gear mechanism;
- the second electric machine is connected to the low-pressure spool via a second transmission mechanism arranged in the transmission gearbox, the second transmission mechanism preferably being a gear mechanism;
- the power turbine and the reduction gear are mechanically connected to each other by a low-pressure shaft, the low-pressure and high-pressure shafts being coaxial, the low-pressure shaft passing internally through the high-pressure shaft;
- the power take-off is able to drive a main transmission gearbox of the aircraft;
- the first and second electric machines are high-voltage electric machines which are connected to a high-voltage electrical network of the control system;
- the first electric machine is configured to start the turboshaft engine;
- the propulsion system is configured to operate in one of the following operating modes:
- a first hybrid operating mode wherein the first electric machine operates in generator mode and the second electric machine operates in motor mode, the electrical energy produced by the first electric machine being used to supply electrical energy to the second electric machine, so as to transfer power from the high-pressure spool towards the low-pressure spool;
- a second hybrid operating mode wherein the first electric machine operates in motor mode and the second electric machine operates in generator mode, the electrical energy produced by the second electric machine being used to supply electrical energy to the first electric machine, so as to transfer power from the low-pressure spool towards the high-pressure spool.

The present invention also relates to an aircraft comprising a hybrid propulsion system as described above.

BRIEF DESCRIPTION OF THE FIGURES

The invention will be better understood and other details, characteristics and advantages of the present invention will become clearer from the following description made by way of non-limiting example and with reference to the attached drawings, wherein.

DETAILED DESCRIPTION OF THE INVENTION

Figure 1:
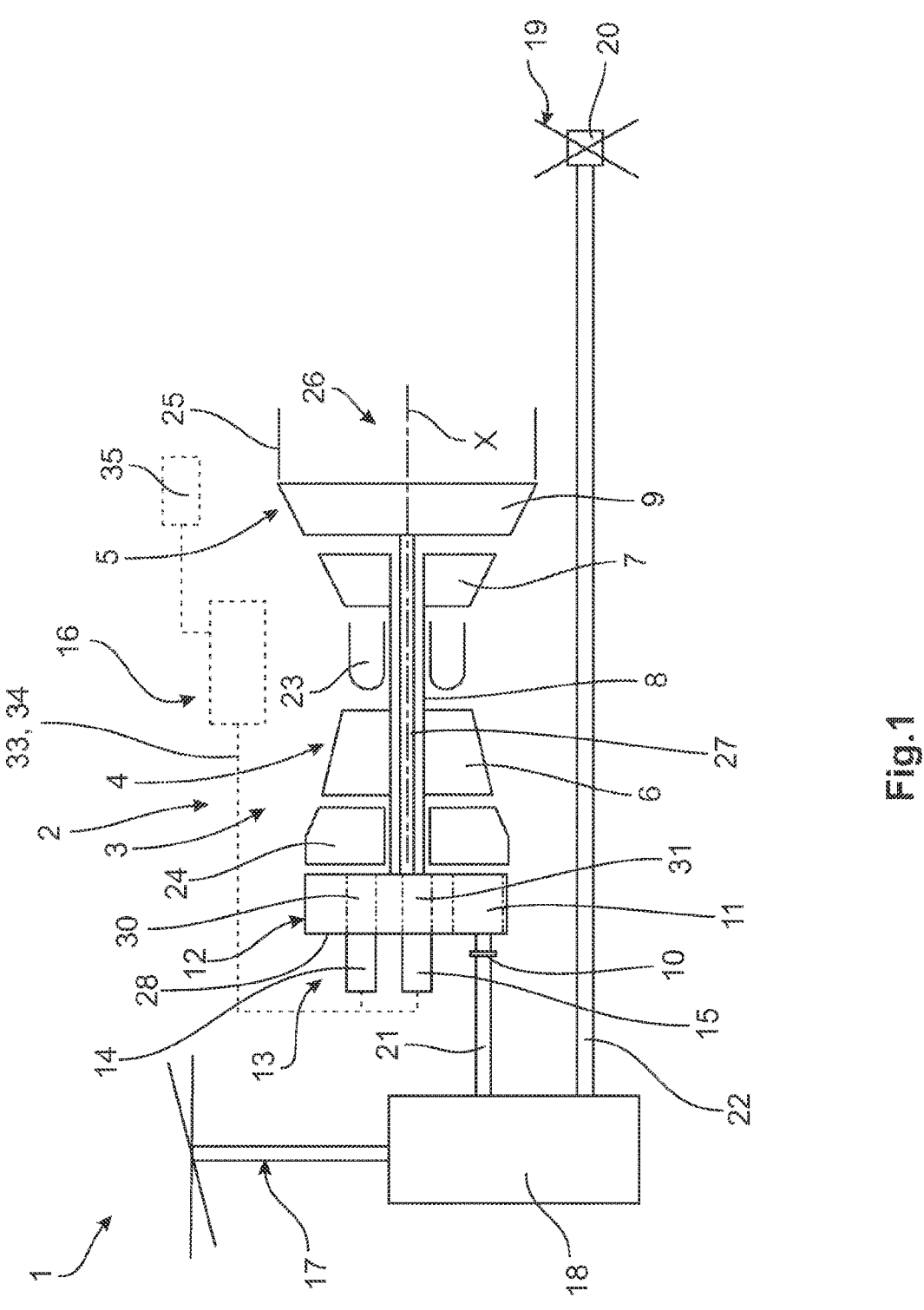
FIG. 1 is a schematic view of an aircraft comprising a hybrid propulsion system according to the invention.
Figure 2:
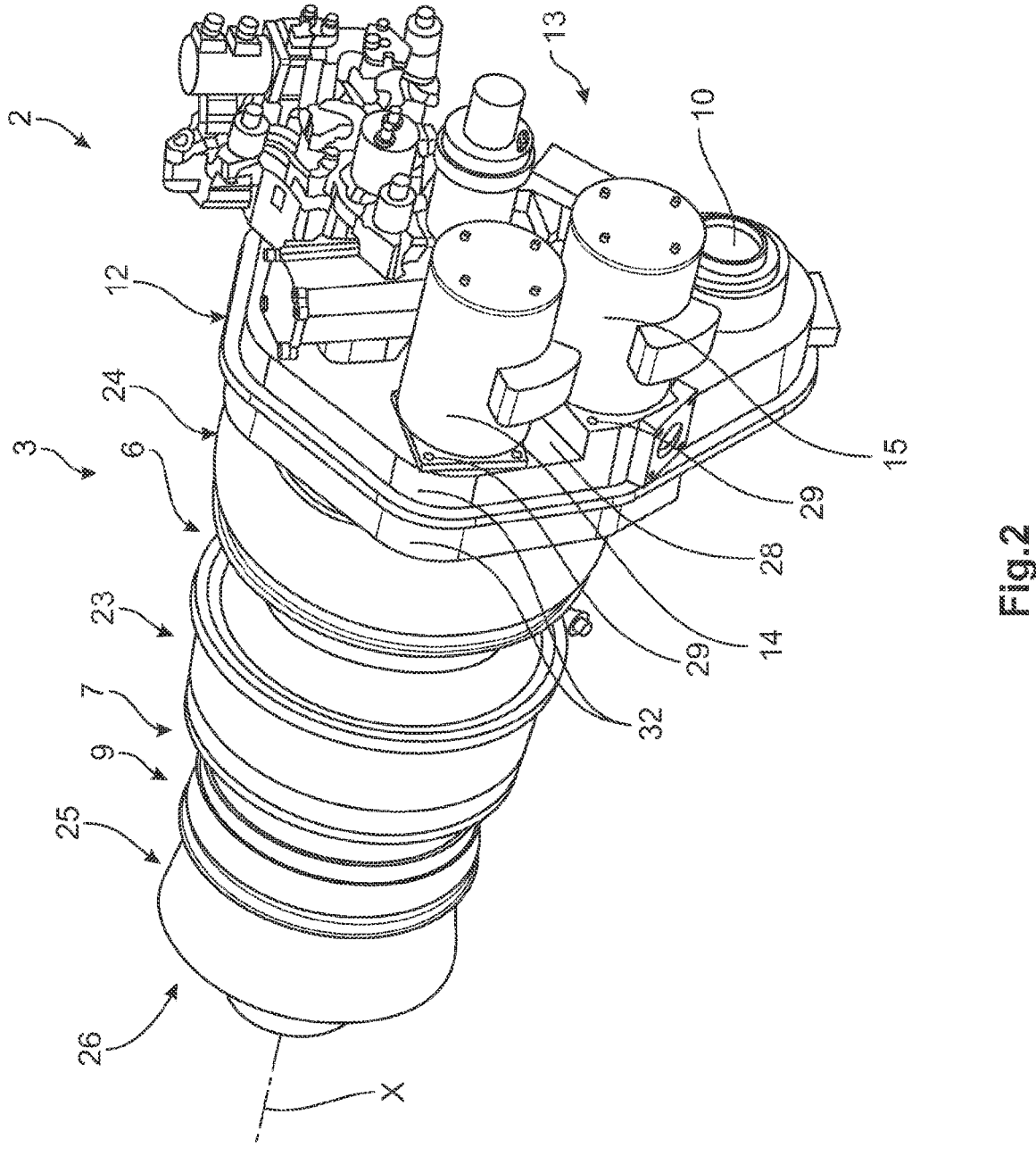
FIG. 2 is a detailed front perspective view of the propulsion system illustrated in FIG. 1.

FIG. 1 shows a diagram of a helicopter 1 comprising a hybrid propulsion system 2.

The example shown is by no means restrictive, the hybrid propulsion system 2 could be used to power an aircraft, a drone or any other rotorcraft such as a gyrodyne.

According to the invention, the hybrid propulsion system 2 comprises:

a turboshaft engine 3 comprising a high-pressure spool 4 and a low-pressure spool 5 movable in rotation, the high-pressure spool 4 comprising a compressor 6 and an expansion turbine 7 mechanically connected to each other by a high-pressure shaft 8, the low-pressure spool 5 comprising a power turbine 9 which drives in rotation a power take-off 10 via a reduction gear 11, the reduction gear 11 forming part of a transmission gearbox 12 which is arranged axially at a front end 13 of the propulsion system 2;

first and second electric machines 14, 15 mechanically connected respectively to the high-pressure and low-pressure spools 4, 5, the electric machines 14, 15 being configured to operate in so-called motor and generator modes, the first and second electric machines 14, 15 being attached to the transmission gearbox 12;

a control system 16 which is configured to allow a power transfer between the high-pressure and low-pressure spools 4, 5 via the first and second electric machines 14, 15.

Positioning the electric machines in this way not only optimizes the overall size of the propulsion system, but also minimizes the modifications required to integrate the electric machines and facilitates maintenance operations, as the electric machines are accessible and positioned in an unobstructed environment.

For each electric machine, the transmission gearbox ensures the transmission of the rotational movement between the spool and the electric machine, while offering the possibility of modifying the parameters associated with the movement (speed, torque, etc.), so as to operate the spool and the electric machine within the desired operating ranges.

The transfer of power between the high-pressure and low-pressure spools via the electric machines allows to optimize the performance of the propulsion system across the assembly of its operating speeds.

As illustrated in FIG. 1, the propulsion system 2 drives a main rotor 17 equipped with a rotary wing via a main transmission gearbox 18 (referred by the acronym BTP), and a tail rotor 19 (also referred by the acronym RAC for "anti-torque rotor") via a rear transmission gearbox 20 (referred by the acronym BTA).

More specifically, the main transmission gearbox 18 is mechanically connected to the power take-off 10 of the turboshaft engine 3 by means of an upper transmission shaft 21. The rear transmission gearbox 20 is mechanically connected to the main transmission gearbox 18 by means of a lower transmission shaft 22. The lower transmission shaft 22 is located vertically below the upper transmission shaft 21.

As illustrated in the figures, the high-pressure spool 4 forms part of a gas generator of the turboshaft engine 3, which comprises the compressor 6, a combustion chamber 23 and the expansion turbine 7. The compressor 6 is supplied with air via an air inlet 24 and comprises one or more compression stages, each stage being either axial or centrifugal. The air inlet 24 is arranged axially between the transmission gearbox 12 and the compressor 6. The combustion chamber 23 is supplied with compressed air via the compressor 6 and with fuel via one or more injectors. The air/fuel mixture is burnt by one or more ignition devices. The exhaust gases from the combustion chamber 23 are expanded in the expansion turbine 7. The expansion turbine 7 comprises one or more expansion stages, each stage being either axial or centripetal. The expansion turbine 7 drives the compressor 6 via the high-pressure shaft 8, which is movable about an axis X. The exhaust gases from the turboshaft engine 3 are evacuated by means of an exhaust nozzle 25 which is arranged axially at a rear end 26 of the propulsion system 2.

As illustrated in the figures, the power turbine 9 is driven by the exhaust gases generated by the gas generator. The power turbine 9 is therefore located axially at the rear of the gas generator. The power turbine 9 drives in rotation the power take-off 10 via the reduction gear 11. The reduction gear 11 allows to reduce the speed of rotation of the power take-off 10 compared with that of the power turbine 9. The power turbine 9 and the reduction gear 11 are mechanically connected to each other by a low-pressure shaft 27. The low-pressure and high-pressure shafts 27, 8 are coaxial and movable about the axis X. The low-pressure shaft 27 passes through the inside of the high-pressure shaft 8. The reduction gear 11 is part of the transmission gearbox 12 which is arranged axially at the front end 13 of the propulsion system 2. Advantageously, the reduction gear 11 is a gear reduction gear. The transmission gearbox 12 carries the first and second electric machines 14, 15, as well as various other accessories such as oil/fuel auxiliaries, an air/oil separator, etc. The transmission gearbox 12 thus transfers the desired power between the accessories and the movable spools 4, 5 of the turboshaft engine 3.

By convention, in the present application, the terms "front" and "rear" define the axial positions of the elements of the propulsion system 2, it being understood that the transmission gearbox 12 is arranged axially at a front end 13 of the propulsion system 2, and the exhaust nozzle 25 is arranged axially at a rear end 26 of the propulsion system 2.

Furthermore, by convention, in this application, the terms "axial" or "axially" refer to any direction parallel to the axis X.

As indicated above and illustrated in the figures, the first electric machine 14 is mechanically connected to the high-pressure spool 4 of the turboshaft engine 3, and is attached to the transmission gearbox 12.

More specifically, the first electric machine 14 is attached to a front face 28 of the transmission gearbox 12. The first electric machine 14 is arranged next to the second electric machine 15. The first electric machine 14 is located vertically above the second electric machine 15. The first electric machine 14 is attached to the transmission gearbox 12 via a flange 29 equipped with screws, but it could be attached via a collar, for example.

The first electric machine 14 is connected to the high-pressure spool 4 via a first transmission mechanism 30 arranged in the transmission gearbox 12. The first transmission mechanism 30 may have a stationary or variable transmission ratio, this ratio may be equal to 1, less than 1 (speed reducing gear) or greater than 1 (speed increasing gear).

Advantageously, the first transmission mechanism 30 is a gear mechanism. The transmission gearbox 12 then contains one or more gears of the first transmission mechanism 30.

The first transmission mechanism 30 is common to or separate from the gear transmission device or devices associated with the other accessories. In addition, the first transmission mechanism 30 is common to or separate from the gear transmission device of the reduction gear 11.

The first electric machine 14 is configured to operate in both motor and generator modes, i.e. the first electric machine 14 is reversible. In motor mode, the first electric machine 14 introduces the mechanical power to the high-pressure spool 4 of the turboshaft engine 3. In generator mode, the first electric machine 14 collects mechanical power from the high-pressure spool 4 of the turboshaft engine 3.

Advantageously, the first electric machine 14 is a high-voltage electric machine, particularly so as to be able to transfer high levels of power.

The first electric machine 14 may be a direct current electric machine or an alternating current electric machine.

Advantageously, the first electric machine 14 is also configured to start the turboshaft engine 3.

As indicated above and illustrated in the figures, the second electric machine 15 is mechanically connected to the low-pressure spool 5 of the turboshaft engine 3, and is attached to the transmission gearbox 12.

More specifically, the second electric machine 15 is attached to a front face 28 of the transmission gearbox 12. The second electric machine 15 is arranged next to the first electric machine 14. The second electric machine 15 is located vertically below the first electric machine 14. The second electric machine 15 is attached to the transmission gearbox 12 via a flange 29 equipped with screws, but it could be attached, for example, via a collar.

The second electric machine 15 is connected to the low-pressure spool 5 via a second transmission mechanism 31 arranged in the transmission gearbox 12. The second transmission mechanism 31 may have a stationary or variable transmission ratio, which may be equal to 1, less than 1 (speed reducing gear) or greater than 1 (speed increasing gear).

Advantageously, the second transmission mechanism 31 is a gear mechanism. The transmission gearbox 12 then contains one or more gears of the second transmission mechanism 31.

The second transmission mechanism 31 is common to or separate from the gear transmission device or devices associated with the other accessories. In addition, the second transmission mechanism 31 is common to or separate from the gear transmission device of the reduction gear 11. Finally, the second transmission mechanism 31 is common to or separate from the first transmission mechanism 30.

In the same way as the first electric machine 14, the second electric machine 15 is configured to operate in so-called motor and generator modes, in other words the second electric machine 15 is reversible. In motor mode, the second electric machine 15 introduces mechanical power to the low-pressure spool 5 of the turboshaft engine 3. In generator mode, the second electric machine 15 collects mechanical power from the low-pressure spool 5 of the turboshaft engine 3.

Advantageously, the second electric machine 15 is a high-voltage electric machine, particularly so as to be able to transfer high levels of power.

The second electric machine 15 may be a direct current electric machine or an alternating current electric machine.

As illustrated in the figures, the transmission gearbox 12 is arranged axially at a front end 13 of the propulsion system 2. The transmission gearbox 12 is formed by two parts 32 bearing against each other in a transverse joint plane (plane perpendicular to the axis X) and held in position by attachment means such as screws. The transmission gearbox 12 contains the first and second transmission mechanisms 30, 31 associated with the first and second electric machines 14, 15, the transmission devices associated with the other accessories and the gear transmission device of the reduction gear 11.

The control system 16 of the propulsion system 2 comprises a turboshaft engine computer called FADEC, a low-voltage electrical network 33 and a high-voltage electrical network 34, these networks 33, 34 being able to be connected to each other or independent of each other.

The high-voltage electrical network 33 is used in particular to transfer significant electrical power between the first and second electric machines 14, 15, this network 33 being commonly referred to as the "internal hybridization electrical network". Thus, advantageously and as indicated above, the first and second electric machines 14, 15 are high-voltage electric machines which are connected to the high-voltage electrical network 33.

The low-voltage electrical network 34 is used in particular to supply power to the various accessories of the propulsion system 2 and the helicopter 1.

The control system 16 imposes an operating mode on the propulsion system 2, depending in particular on the different phases of flight of the helicopter 1 (take-off, cruise, landing, search, obstacle, standby, emergency (turboshaft engine fault, for example)).

In particular, the control system 16 may impose a thermal operating mode wherein the propulsive mechanical energy required to drive the rotors 17, 19 is supplied solely by the turboshaft engine 3.

The control system 16 may also impose hybrid operating modes wherein the propulsive mechanical energy required to drive the rotors 17, 19 is supplied both by the turboshaft engine 3 and also by the first electric machine 14 and/or by the second electric machine 15 operating in motor mode.

As indicated above, the control system 16 is configured to allow power to be transferred between the high-pressure and low-pressure spools 4, 5 via the first and second electric machines 14, 15.

The propulsion system 2 may thus operate in a first hybrid operating mode wherein the first electric machine 14 operates in generator mode and the second electric machine 15 operates in motor mode, the electrical energy produced by the first electric machine 14 being used to supply electrical power to the second electric machine 15, so as to transfer power from the high-pressure spool 4 towards the low-pressure spool 5.

The propulsion system 2 may also operate in a second hybrid operating mode wherein the first electric machine 14 operates in motor mode and the second electric machine 15 operates in generator mode, the electrical energy produced by the second electric machine 15 being used to supply electrical power to the first electric machine 14, so as to transfer power from the low-pressure spool 5 towards the high-pressure spool 4.

Advantageously, the control system 16 comprises one or more electrical energy storage devices 35 which are each configured to store the electrical energy produced by the first electric machine 14 and/or the second electric machine 15. Each electrical energy storage device 35 comprises, for example, one or more batteries or supercapacitors. The stored electrical energy is used, for example, to supply power to the first electric machine 14 and/or the second electric machine 15 operating in motor mode during certain phases of flight, or to supply power to the electrical accessories of the propulsion system 2 and/or of the helicopter 1.

The control system 16 may comprise one or more power converters configured to convert alternating current to direct current (or vice versa). Such a converter is used, for example, to allow power to be transferred between the electric machines 14, 15 via a high-voltage direct current bus referred to as an HVDC bus.

Advantageously, the control system 2 comprises protection devices allowing to protect the electrical networks 33, 34 against the short-circuits, the overvoltages and the overcurrents.

The various movable elements of the propulsion system 2 may be rotationally connected to each other by coupling means such as splines (floating or stationary), screwed flanges or by shrink-fitting shafts. The coupling means may comprise a clutch or elastically deformable means referred to as flexible couplings.

Advantageously, the first and second electric machines 14, 15 are cooled and lubricated via the cooling and lubrication circuit of the propulsion system 2. Such a circuit is already used to cool and lubricate the transmission gearbox 12.

This means that the cooling and lubrication devices associated with the various elements of the propulsion system 2 may be pooled to optimize the overall weight of the propulsion system 2.

For the first and second electric machines 14, 15, the cooling and lubrication circuit is used in particular to cool the rotors and the stators of the electric machines 14, 15, but also to lubricate the bearings guiding the rotors and the dynamic seals. In the case of the transmission gearbox 12, the cooling and lubrication circuit is used in particular to cool and lubricate the gears and the rolling bearings inside the case 12.

The cooling and lubrication circuit, for example, is supplied with oil.

The invention claimed is:

1. An aircraft comprising:
a hybrid propulsion system comprsing:
  a turboshaft engine comprising a high-pressure spool and a low-pressure spool movable in rotation, the high-pressure spool comprising a compressor and an expansion turbine mechanically connected to each other by a high-pressure shaft, the low-pressure spool comprising a power turbine which drives a power take-off in rotation via a reduction gear, the reduction gear forming part of a first transmission gearbox which is arranged axially at a front end of the propulsion system;
  first and second electric machines mechanically connected to the high-pressure and low-pressure spools respectively, the electric machines being configured to operate in so-called motor and generator modes, the first and second electric machines being attached to the first transmission gearbox;
  a control system which is configured to allow power to be transferred between the high-pressure and low-pressure spools via the first and second electric machines;
a main transmission gearbox which is driven by the power take-off of the turboshaft engine.

2. The aircraft according to claim 1, wherein the first and second electric machines are attached to a front face of the first transmission gearbox.

3. The aircraft according to claim 1, wherein the first electric machine is connected to the high-pressure spool via a first transmission mechanism arranged in the first transmission gearbox, the first transmission mechanism preferably being a gear mechanism.

4. The aircraft according to claim 1, wherein the second electric machine is connected to the low-pressure spool via a second transmission mechanism arranged in the first transmission gearbox, the second transmission mechanism preferably being a gear mechanism.

5. The aircraft according to claim 1, wherein the power turbine and the reduction gear are mechanically connected to each other by a low-pressure shaft, the low-pressure and high-pressure shafts being coaxial, the low-pressure shaft passing internally through the high-pressure shaft.

6. The aircraft according to claim 1, wherein the main transmission gearbox is mechanically connected to the power take-off of the turboshaft engine by means of an upper transmission shaft.

7. The aircraft according to claim 1, wherein the first and second electric machines are high-voltage electric machines which are connected to a high-voltage electrical network of the control system.

8. The aircraft according to claim 1, wherein the first electric machine is configured to start the turboshaft engine.

9. The aircraft according to claim 1, wherein the propulsion system is configured to operate according to one of the following operating modes:
  a first hybrid operating mode wherein the first electric machine operates in generator mode and the second electric machine operates in motor mode, the electrical energy produced by the first electric machine being used to supply electrical energy to the second electric machine, so as to transfer power from the high-pressure spool towards the low-pressure spool;
  a second hybrid operating mode wherein the first electric machine operates in motor mode and the second electric machine operates in generator mode, the electrical energy produced by the second electric machine being used to supply electrical energy to the first electric machine, so as to transfer power from the low-pressure spool towards the high-pressure spool.

10. The aircraft according to claim 1, wherein the aircraft comprises a rear transmission gearbox which is mechanically connected to the main transmission gearbox by means of a lower transmission shaft, the lower transmission shaft being located below an upper transmission shaft.

11. The aircraft according to claim 1, wherein the first and second electric machines are attached to a front face of the first transmission gearbox, the first and second electric machines being located directly next to each other.

12. The aircraft according to claim 1, wherein the first and second electric machines are attached to a front face of the first transmission gearbox, the first and second electric machines being located above the power take-off.

13. The aircraft according to claim 1, wherein the first and second electric machines are attached to a front face of the first transmission gearbox, the first and second electric machines being located above the power take-off, the first electric machine being located above the second electric machine.

14. The aircraft according to claim 1, wherein the first and second electric machines are attached to a front face of the first transmission gearbox, the propulsion system comprising accessories that are transversely opposed to the first and second electric machines.

15. The aircraft according to claim 1, wherein the control system comprises a turboshaft engine computer, a low-voltage electrical network and a high-voltage electrical network.

16. The aircraft according to claim 1, wherein the control system comprises at least one electrical energy storage device which is configured to store the electrical energy produced by the first electric machine and the second electric machine.

17. The aircraft according to claim 1, wherein the control system comprises at least one power converter configured to convert alternating current to direct current or vice versa.

18. The aircraft according to claim 1, wherein the propulsion system comprises a cooling and lubrication circuit configured to cool and lubricate the first transmission gearbox, the first and second electric machines being cooled and lubricated via the cooling and lubrication circuit.

19. A helicopter comprising:

a hybrid propulsion system comprising:

a turboshaft engine comprising a high-pressure spool and a low-pressure spool movable in rotation, the high-pressure spool comprising a compressor and an expansion turbine mechanically connected to each other by a high-pressure shaft, the low-pressure spool comprising a power turbine which drives a power take-off in rotation via a reduction gear, the reduction gear forming part of a first transmission gearbox which is arranged axially at a front end of the propulsion system;

first and second electric machines mechanically connected to the high-pressure and low-pressure spools respectively, the electric machines being configured to operate in so-called motor and generator modes, the first and second electric machines being attached to the first transmission gearbox;

a control system which is configured to allow power to be transferred between the high-pressure and low-pressure spools via the first and second electric machines;

a main transmission gearbox which is mechanically connected to the power take-off of the turboshaft engine by means of an upper transmission shaft;

a rear transmission gearbox which is mechanically connected to the main transmission gearbox by means of a lower transmission shaft, the lower transmission shaft being located below the upper transmission shaft.

\*  \*  \*  \*  \*